(12) United States Patent
Yan et al.

(10) Patent No.: US 11,190,351 B2
(45) Date of Patent: Nov. 30, 2021

(54) KEY GENERATION METHOD AND ACQUISITION METHOD, PRIVATE KEY UPDATE METHOD, CHIP, AND SERVER

(71) Applicant: SHENZHEN GOODIX TECHNOLOGY CO., LTD., Guangdong (CN)

(72) Inventors: Ke Yan, Shenzhen (CN); Qingbin Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 250 days.

(21) Appl. No.: 16/706,624

(22) Filed: Dec. 6, 2019

(65) Prior Publication Data
US 2020/0119915 A1 Apr. 16, 2020

Related U.S. Application Data

(63) Continuation of application No. PCT/CN2018/110053, filed on Oct. 12, 2018.

(51) Int. Cl.
*H04L 29/06* (2006.01)
*H04L 9/08* (2006.01)
*H04L 9/30* (2006.01)

(52) U.S. Cl.
CPC .......... *H04L 9/0869* (2013.01); *H04L 9/0891* (2013.01); *H04L 9/302* (2013.01); *H04L 9/3066* (2013.01)

(58) Field of Classification Search
CPC ..... H04L 9/0869; H04L 9/302; H04L 9/3066; H04L 9/0891
See application file for complete search history.

(56) References Cited

U.S. PATENT DOCUMENTS

2006/0179305 A1  8/2006 Zhang
2010/0178977 A1* 7/2010 Kim ..................... G06Q 20/382
                                                    463/25
(Continued)

FOREIGN PATENT DOCUMENTS

CN    103888243 A    6/2014
CN    106161017 A    11/2016
(Continued)

OTHER PUBLICATIONS

Barker et al., "Recommendation for Pair-Wise Key Establishment Schemes Using Discrete Logarithm Cryptography," NIST Special Publication 800-56A Revision 2, May 2013, retrieved from http://dx.doi.org/10.6028/NIST.SP.800-56Ar2, 138 pages.

(Continued)

*Primary Examiner* — Thaddeus J Plecha
(74) *Attorney, Agent, or Firm* — Davis Wright Tremaine LLP

(57) ABSTRACT

The present disclosure relates to a key generation method applied to a chip storing an internal key, which includes: acquiring (101) a first and a second random number; generating (102) an initial private key of the chip according to the first random number and the internal key, and generating an update private key of the chip according to the second random number and the internal key; generating (103) an initial public key corresponding to the initial private key according to the initial private key, and generating an update public key corresponding to the update private key according to the update private key; and sending (104) the initial public key, the update public key, and the second random number to a server that sends the second random number to the chip when receiving a private key update request of the chip, to trigger a private key update of the chip.

17 Claims, 9 Drawing Sheets

(56) References Cited

U.S. PATENT DOCUMENTS

| | | | |
|---|---|---|---|
| 2012/0008772 | A1 | 1/2012 | Sugahara et al. |
| 2014/0208117 | A1 | 7/2014 | Hayashi et al. |
| 2014/0219443 | A1 | 8/2014 | Brainis et al. |
| 2014/0286491 | A1* | 9/2014 | Atherton ............... H04W 12/06 380/270 |
| 2015/0016606 | A1 | 1/2015 | Omino et al. |
| 2017/0222813 | A1* | 8/2017 | Lin ........................... H04L 9/14 |
| 2018/0007025 | A1* | 1/2018 | Oberheide ............ H04L 9/0863 |
| 2020/0178080 | A1* | 6/2020 | Yasaki ................ H04W 12/069 |

FOREIGN PATENT DOCUMENTS

| | | |
|---|---|---|
| CN | 108347334 A | 7/2018 |
| EP | 1505764 A1 | 2/2005 |
| EP | 1969762 A2 | 9/2008 |
| EP | 2355401 A1 | 8/2011 |
| WO | 2007102907 A2 | 9/2007 |
| WO | 2007102907 A3 | 5/2008 |
| WO | 2017060675 A1 | 4/2017 |

OTHER PUBLICATIONS

Extended European Search Report dated May 20, 2020, Patent Application No. 18919399.8-1218, 12 pages.
Raj et al., "fTPM: A Firmware-based TPM 2.0 Implementation," Nov. 9, 2015, retrieved from https://www.microsoft.com/en-us/research/wp-content/uploads/2016/02/msr-tr-2015-84.pdf, 23 pages.
Wikipedia, "X.509," Wikipedia Encyclopedia, Aug. 16, 2018, retrieved May 13, 2020, from https://web.archive.org/web/20180816222554/https://en.wikipedia.org/wiki/X.509, 16 pages.
International Search Report mailed in International Patent Application No. PCT/CN2018/110053, filed on Oct. 12, 2018, 4 pages.

* cited by examiner

KEY GENERATION METHOD AND ACQUISITION METHOD, PRIVATE KEY UPDATE METHOD, CHIP, AND SERVER

CROSS REFERENCE TO RELATED APPLICATIONS

The present application is a continuation of international application No. PCT/CN2018/110053, filed on Oct. 12, 2018, which is hereby incorporated by reference in its entirety.

TECHNICAL FIELD

The present disclosure relates to the field of chip security technology, and in particular, to a key generation method and acquisition method, a private key update method, a chip, and a server.

BACKGROUND

The rapid development of technologies of Internet of things has brought great convenience to people's life. However, the security and privacy issues brought about by the Internet of things are also receiving increasing attention. To ensure the credibility of a device, a verification method based on a certificate chain is usually adopted. That is, each chip is embedded with a different pair of public key and private key during production, where a private key is stored in the chip and a public key is protected by a certificate authority (CA) signature. In communication, the certificate chain and the signature are sent to the other party to verify the credibility of the device.

The inventors have found that the existing technology has at least the following problems: When a user of the chip changes, the chip is repaired and maintained, or an original private key is leaked, it is necessary to update the private key in time to ensure the security of the user's privacy. In the existing technology, a private key is usually updated by returning to the factory for maintenance, which consumes more manpower and material resources. Moreover, a trusted center is required to know an updated private key, which violates the principle that the private key of the security chip is known only to the chip, thus causing a potential safety hazard.

SUMMARY

Some embodiments of the present disclosure are intended to provide a key generation method and acquisition method, a private key update method, a chip, and a server, so that when a private key of a chip is updated, lots of manpower and material resources can be saved, and the security and reliability are improved.

An embodiment of the present disclosure provides a key generation method applied to a chip that stores an internal key. The method includes: acquiring a first random number and a second random number; generating an initial private key of the chip according to the first random number and the internal key, and generating an update private key of the chip according to the second random number and the internal key; generating an initial public key corresponding to the initial private key according to the initial private key, and generating an update public key corresponding to the update private key according to the update private key; and sending the initial public key, the update public key, and the second random number to a server that is configured to send the second random number to the chip when receiving a private key update request of the chip, to trigger a private key update of the chip.

An embodiment of the present disclosure further provides a private key update method applied to a chip, including: sending a private key update request to a server, the server storing an update random number, an update public key, and a first public key corresponding to a first private key of the chip, and the first private key being a private key to be updated according to the private key update request; receiving the update random number fed back by the server, and generating an update private key according to the update random number and a stored internal key; generating an update public key corresponding to the update private key according to the update private key, and signing an information to be signed by using the update private key, where the information to be signed at least includes the update public key; and sending the signed information to the server, so that the server verifies the received signed information by using the update public key stored in the server, and updates the first public key to be the update public key after the verification succeeds.

An embodiment of the present disclosure further provides a key acquisition method applied to a server, including: receiving and storing an update random number, an update public key, and a first public key corresponding to a first private key that are sent by a chip, where the first private key is a private key currently used by the chip; after receiving a private key update request of the chip, feeding back the update random number stored in the server to the chip, so that the chip generates an update private key and a corresponding update public key according to the update random number and an internal key of the chip, and signs an information to be signed by using the update private key, where the information to be signed at least includes the update public key; receiving the signed information sent by the chip; and verifying the received signed information by using the update public key stored in the server, and updating the first public key to be the update public key after the verification succeeds.

An embodiment of the present disclosure further provides a chip, including: at least one processor, and a memory communicably connected with the at least one processor, the memory stores an instruction executable by the at least one processor, the instruction, when executed by the at least one processor, causes the at least one processor to perform the key generation method or the private key update method as described above.

An embodiment of the present disclosure further provides a server, including: at least one processor, and a memory communicably connected with the at least one processor; the memory stores an instruction executable by the at least one processor, the instruction, when executed by the at least one processor, causes the at least one processor to perform the key acquisition method as described above.

Compared with the existing technology, in the embodiments of the present disclosure, when an initial private key and an initial public key corresponding to the initial private key of the chip are generated by using a first random number and an internal key, an update private key and an update public key of the chip are further generated by using a second random number and the internal key, and the initial public key, the update public key, and the second random number are sent to the server, so that the server can send the second random number to the chip when receiving a private key update request of the chip, to trigger a private key update of the chip. In the embodiments of the present disclosure, the private key of the chip is generated by using the random number and the internal key stored in the chip, thus implementing the division of the private key of the chip. That is, the private key is divided into the internal key and the random number. The internal key is stored in the chip, and the outside world has no way of knowing the internal key, so that the private key can be updated by updating the external random number. Only the chip itself can acquire the update private key by using the second random number sent by the server and the internal key, which conforms to the principle that the private key of the chip is known only to the chip, thus improving the security and reliability. Moreover, the private key in the embodiments of the present disclosure can be updated without being returned to the factory for maintenance, thus saving lots of manpower and material resources.

When the private key needs to be updated, the chip sends the private key update request to the server. The server stores the update random number, the update public key, and the first public key corresponding to the first private key of the chip, and the first private key is a private key to be updated according to the private key update request, so that the server feeds back the update random number stored in the server to the chip after receiving the private key update request. The chip generates the update private key according to the update random number and the stored internal key, that is, the update private key of the chip may be obtained only by the chip, which conforms to the principle that the private key of the chip is known only to the chip, thereby improving the security and reliability. The chip generates the update public key corresponding to the update private key according to the update private key, and signs the information to be signed by using the update private key, where the information to be signed at least includes the update public key, and is signed by using the update private key, so that the communication security may be ensured even if the initial private key is leaked. The chip sends the signed information to the server, so that the server can verify the received signed information by using the update public key stored in the server, and update the first public key to be the update public key after the verification succeeds. In the private key update method in the embodiments of the present disclosure, the private key can be updated without being returned to the factory for maintenance, thus saving lots of manpower and material resources. The private key is always in the chip during updating, thereby ensuring the security of the update.

For example, after sending the initial public key, the update public key, and the second random number to a server, the method further includes: destroying the second random number, the update private key, and the update public key. The second random number, the update private key, and the update public key generated by the chip are data that will be used for the next update request. Therefore, after the initial public key, the update public key, and the second random number are sent to the server, the second random number, the update private key, and the update public key are destroyed, to avoid storing excessive data in the chip. Moreover, the second random number required for generating the update private key is not stored in the chip, so as to prevent an attacker from obtaining the update private key by cracking the chip, thus further enhancing the security.

For example, the generating an initial private key of the chip according to the first random number and the internal key, and generating an update private key of the chip according to the second random number and the internal key specifically includes: acquiring the internal key by firmware; generating, by the firmware, the initial private key of the chip according to the acquired internal key and the first random number, and generating the update private key of the chip according to the acquired internal key and the second random number; and the key generation method of the chip further includes: after sending the initial public key, the update public key, and the second random number to a server, disabling an access authority of the firmware to the internal key, to achieve the operation irreversibility, thereby preventing an attacker from using a firmware vulnerability to obtain the internal key of the chip, and further enhancing the security.

For example, both the initial private key and the update private key are ECC private keys; or both the initial private key and the update private key are RSA private keys; or one of the initial private key and the update private key is an ECC private key, and the other is an RSA private key, thus providing a plurality of implementations of the initial private key and the update private key.

For example, the internal key is stored in a read-only storage area of the chip, ensuring that the internal key is not able to be modified.

For example, before signing the update public key by using the update private key, the method further includes: acquiring a third random number; generating a second private key of the chip according to the third random number and the internal key, and generating a second public key corresponding to the second private key according to the second private key; and in the step of signing an information to be signed by using the update private key, the information to be signed further includes: the third random number and the second public key; the third random number and the second public key are provided for the server so that the server replaces the update random number stored in the server with the third random number and replaces the update public key stored in the server with the second public key after the verification succeeds. In the current update, the second public key and the third random number that will be used for the next update are generated, and after the information to be signed further including the second public key and the third random number is signed by using the update private key, the signed information is sent to the server, so that after the verification on the received signed information succeeds, the server can complete the update of the first public key and the first private key that are currently used, and can also store the second public key and the third random number that will be used for the next update, thus facilitating the next update.

For example, after generating a second public key corresponding to the second private key according to the second private key, the method further includes: destroying the second private key. That is, the chip does not store the second private key obtained after the next update, thus preventing an attacker from cracking the chip to obtain the second private key obtained after the next update.

For example, before signing an information to be signed by using the update private key, the method further includes: receiving a challenge code fed back by the server, where the challenge code is a challenge code generated by the server when receiving the update request; and in the step of signing an information to be signed by using the update private key, the information to be signed further includes the challenge code, thereby ensuring that the signed information is not leaked when being transmitted to the server.

For example, after receiving a private key update request of the chip, and before feeding back the update random number stored in the server to the chip, the method further includes verifying the private key update request; and if the verification succeeds, feeding back the update random number stored in the server to the chip, thereby further ensuring the security of the update.

BRIEF DESCRIPTION OF THE DRAWINGS

One or more embodiments are described by way of example with reference to the corresponding figures in the accompanying drawings, and the descriptions are not to be construed as limiting the embodiments.

DETAILED DESCRIPTION

To make objectives, technical solutions, and advantages of the present disclosure clearer, the following describes some embodiments of the present disclosure in detail with reference to the accompanying drawings and the embodiments. It should be understood that, specific embodiments described herein are merely used to illustrate the present disclosure, and are not intended to limit the present disclosure.

A first embodiment of the present disclosure relates to a key generation method applied to a chip that stores an internal key, and the method includes: acquiring a first random number and a second random number; generating an initial private key of the chip according to the first random number and the internal key, and generating an update private key of the chip according to the second random number and the internal key; generating an initial public key corresponding to the initial private key according to the initial private key, and generating an update public key corresponding to the update private key according to the update private key; and sending the initial public key, the update public key, and the second random number to a server, so that the server sends the second random number to the chip when receiving a private key update request of the chip, to trigger a private key update of the chip. Therefore, when the private key of the chip is updated, lots of manpower and material resources can be saved, and the security and reliability are improved. Implementation details of the key generation method in this embodiment are specifically described below, and the following are merely the implementation details provided for ease of understanding and are not mandatory for implementing this solution.

The key generation method in this embodiment may be performed by downloading test firmware in a safe trusted environment in a chip production process, and the chip stores the internal key. Preferably, the internal key may be stored in a read-only storage area of the chip. For example, the internal key key_internal is directly written into a non-modifiable device, such as Efuse or a read-only memory (ROM), in the chip during chip production, and key_internal of each chip may be different.

Figure 1:
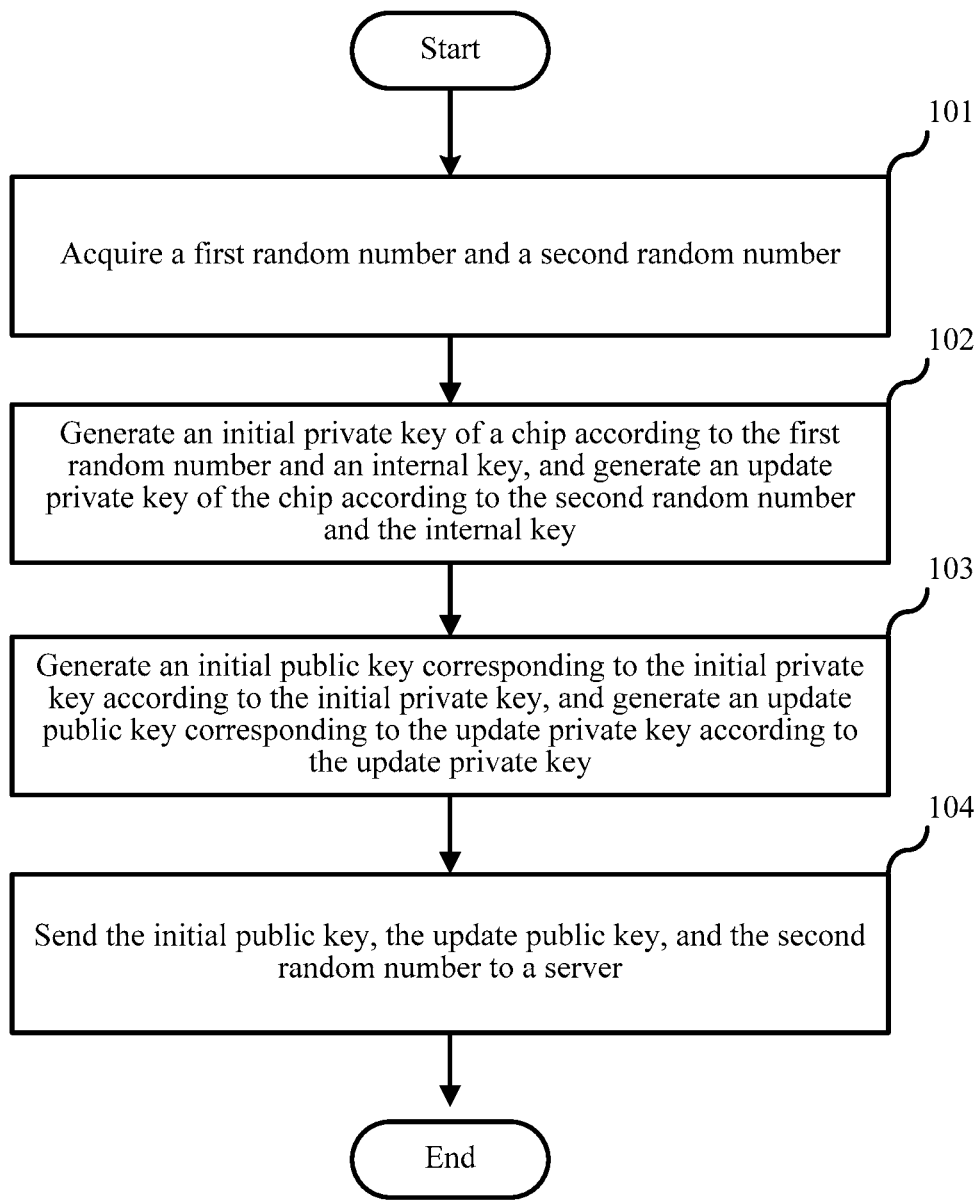
FIG. 1 is a flowchart of a key generation method according to a first embodiment of the present disclosure.

A specific process of the key generation method in this embodiment is shown in FIG. 1, including the following steps:

Step 101: Acquire a first random number and a second random number.

Specifically, the test firmware may call a random number module to generate two random numbers, including the first random number random for generating an initial private key and the second random number random2 that will be used for the next update of the initial private key.

Step 102: Generate an initial private key of a chip according to the first random number and an internal key, and generate an update private key of the chip according to the second random number and the internal key.

Specifically, key_internal may be acquired by firmware, and the firmware may be a test firmware downloaded in a safe trusted environment. The test firmware may read key_internal, generate, according to the first random number random and the internal key key_internal, the initial private key key_device of the chip by using an elliptic curves cipher (referred to as "ECC" for short) solution or an RSA solution, and generate the update private key key_device2 of the chip according to the second random number random2 and the internal key key_internal. The initial private key key_device and the update private key key_device2 may both be ECC private keys, that is, both the initial private key key_device and the update private key key_device2 are generated by using the ECC solution. Alternatively, the initial private key key_device and the update private key key_device2 may both be RSA private keys, that is, both the initial private key key_device and the update private key key_device2 are generated by using the RSA solution. Alternatively, one of the initial private key key_device and the update private key key_device2 is an ECC private key, and the other is an RSA private key.

Figure 2:
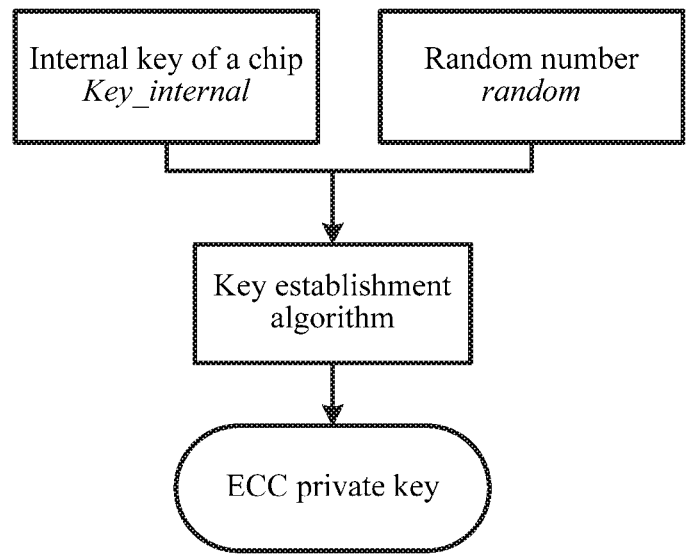
FIG. 2 is a schematic diagram of generating an ECC private key according to the first embodiment of the present disclosure.

For example, the initial private key is an ECC private key. A schematic diagram of generating the ECC private key is shown in FIG. 2.

To be specific, the ECC solution requires that the private key is less than the order of a curve, so that a key establishment algorithm may be used directly. The unique initial private key key_device of the chip may be obtained from the internal key key_internal of the chip and the first random number random by using a key derivation function KDF, that is, the initial private key key_device is obtained by using the following formula (1):

$$\text{key\_device} = \text{KDF}(\text{key\_int eral}, \text{random}) \tag{1}$$

Here, The KDF function may be established by using a key specified by Special Publications 800-108[4] of National Institute of Standards and Technology (referred to as "NIST SP800-108[4]" for short), and if the generated initial private key key_device is greater than the order of the curve, the following formula (2) is executed until the initial private key key_device is less than the order of the curve.

$$\text{key\_device} = \text{KDF}(\text{key\_device}, \text{random}) \quad (2)$$

The initial private key obtained by using the ECC solution is an ECC private key, and in the actual application, the update private key key_device2 may also be obtained by using the above ECC solution, which is not described in this implementation again to avoid repetition.

Figure 3:
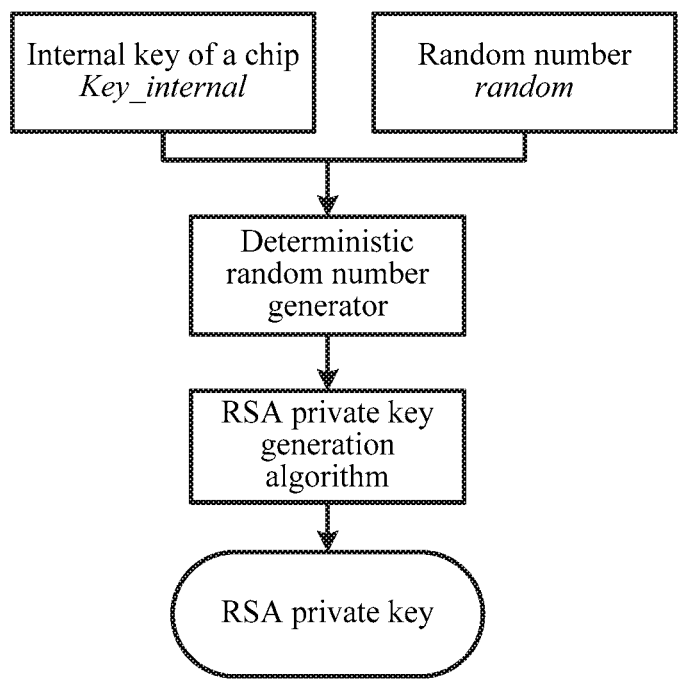
FIG. 3 is a schematic diagram of generating an RSA private key according to the first embodiment of the present disclosure.

For example, the initial private key is an RSA private key. A schematic diagram of generating the RSA private key is shown in FIG. 3.

To be specific, the RSA solution requires that p and q used for generating a private key must be prime numbers, while the generation of p and q relies on a random number generator. To ensure the determinacy of the private key update, a deterministic random number generator may be used to generate random numbers. The initial private key being an RSA private key is used as an example below for description: the deterministic random number generator uses the internal key key_internal and the first random number random as seeds without introducing other entropy sources, to ensure the determinacy of a generated random number sequence, that is, the random number sequence generated from the same key_internal and random is determined, so that a result obtained based on an RSA private key generation algorithm is also determined.

The deterministic random number generator may use a Secure Hash Algorithm (referred to as "SHA algorithm" for short). For example, an $n^{th}$ generated random number rndn may be calculated by using the following formula (3):

$$\text{rnd}_n = \text{SHA}(\text{key\_int ernal} \| \text{random} \| \text{rnd}_{n-1}) \quad (3)$$

A deterministic random number generation algorithm may also be used, but does not have a continuously sampled entropy source, instead key_internal and random are used as initial values of the deterministic random number generator. The initial private key obtained by using the RSA solution is an RSA private key, and in the actual application, the update private key key_device2 may also be obtained by using the above RSA solution, which is not described in this implementation again to avoid repetition.

Step 103: Generate an initial public key corresponding to the initial private key according to the initial private key, and generate an update public key corresponding to the update private key according to the update private key.

That is, the chip may generate the corresponding initial public key pubkey_device according to the initial private key key_device, and generate the corresponding update public key pubkey_device2 according to the update private key key_device2.

Step 104: Send the initial public key, the update public key, and the second random number to a server.

Specifically, the chip may first send a triplet including the initial public key pubkey_device, the update public key pubkey_device2, and the second random number random2 to a host computer, and the host computer may be a main control device for directly controlling the chip. After receiving the triplet, the host computer sends the triplet to a server, and the server may be a CA server. The CA server may store the triplet in a database. When receiving a private key update request of the chip, the CA server may send the second random number random2 stored in the database to the chip, to trigger a private key update of the chip.

In the actual application, after the triplet is sent to the server, an access authority of the test firmware to the internal key key_internal may be disabled. The access authority may be disabled by disabling a GPIO port or fusing a corresponding control bit in the Efuse, to achieve the irreversibility of the operation and further prevent an attacker from using a test firmware vulnerability to obtain key_internal. After the chip production is completed, only the access authority of bootloader to key_internal may be retained, and if the private key is required to be generated in the subsequent process, the private key may be generated during the bootloader phase.

Compared with the existing technology, in this embodiment, a private key of the chip is generated by using a random number and an internal key stored in the chip, thus implementing the division of the private key of the chip. That is, the private key is divided into the internal key and the random number. The internal key is stored in the chip, and the outside world has no way of knowing the internal key, so that the private key can be updated by updating the external random number. Only the chip can use a second random number sent by the server and the internal key to acquire an update private key, which conforms to the principle that the private key of the chip is known only to the chip, thus improving the security and reliability. Moreover, the private key in this embodiment of the present disclosure can be updated without being returned to the factory for maintenance, thus saving lots of manpower and material resources.

A second embodiment of the present disclosure relates to a key generation method. The second embodiment is a further improvement based on the first embodiment, and the main improvement is that: in the second embodiment, after the initial public key, the update public key, and the second random number are sent to the server, the second random number, the update private key, and the update public key are destroyed, to avoid storing excessive data in the chip. Moreover, the second random number required for generating the update private key is not stored in the chip, to prevent an attacker from obtaining the update private key by cracking the chip, thus further enhancing the security.

Figure 4:
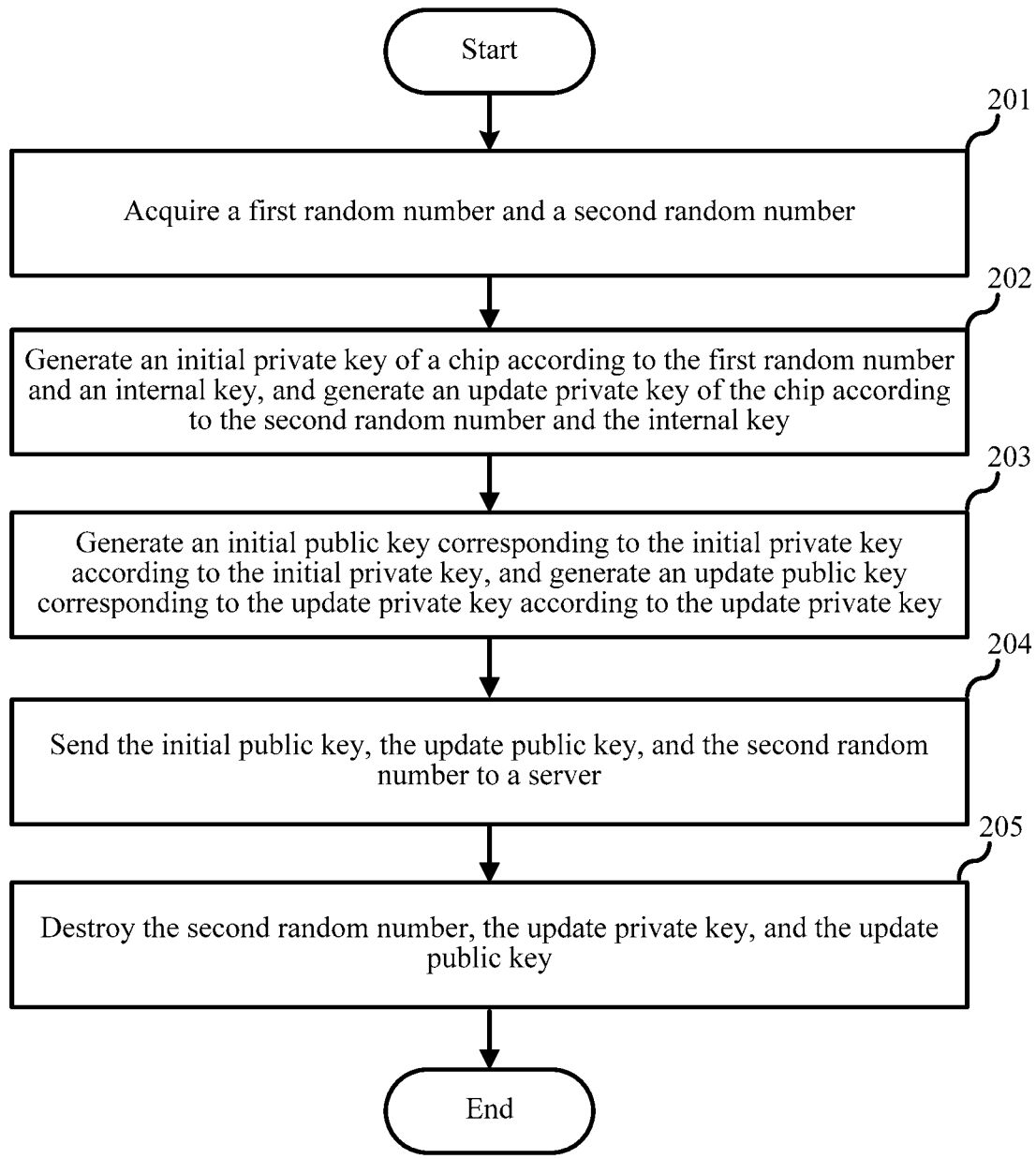
FIG. 4 is a flowchart of a key generation method according to a second embodiment of the present disclosure.

A specific process of the key generation method in this embodiment is shown in FIG. 4, including the following steps:

Step 201: Acquire a first random number and a second random number.

Step 202: Generate an initial private key of a chip according to the first random number and an internal key, and generate an update private key of the chip according to the second random number and the internal key.

Step 203: Generate an initial public key corresponding to the initial private key according to the initial private key, and generate an update public key corresponding to the update private key according to the update private key.

Step 204: Send the initial public key, the update public key, and the second random number to a server.

Step 201 to step 204 are roughly the same as step 101 to step 104 in the first embodiment, and are not described herein again to avoid repetition.

Step 205: Destroy the second random number, the update private key, and the update public key.

Specifically, the second random number random2, the update private key key_device2, and the update public key pubkey_device2 are data that is used only when the private key of the chip is updated, and belong to sensitive information that is not used temporarily for the chip. Therefore, the above sensitive information may be directly destroyed after the triplet is sent to the server. The first random number does not belong to sensitive information, and may be stored in a storage chip flash.

Compared with the existing technology, in this embodiment, after the initial public key, the update public key, and the second random number are sent to the server, the second random number, the update private key, and the update public key are destroyed, to avoid storing excessive data in the chip. Moreover, the second random number required for generating the update private key is not stored in the chip, so as to prevent an attacker from obtaining the update private key by cracking the chip, thus further enhancing the security.

Figure 5:
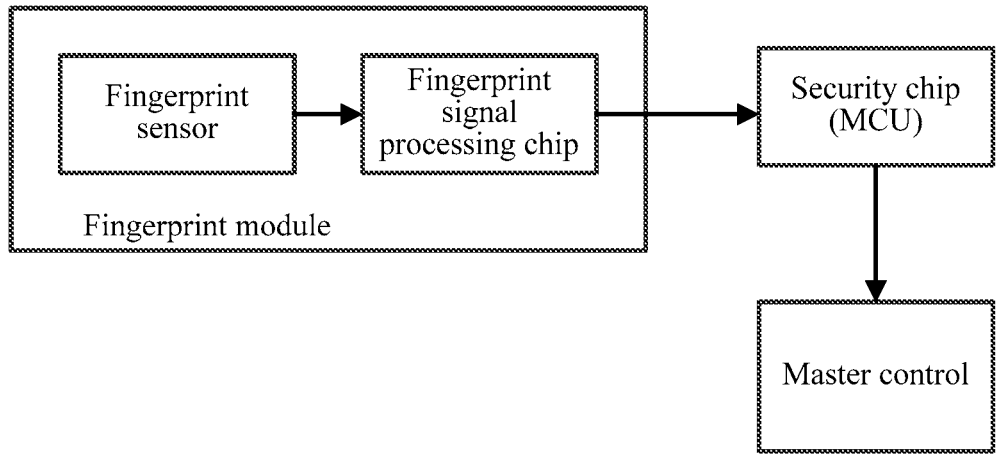
FIG. 5 is a schematic diagram of an application scenario of a private key update method according to a third embodiment of the present disclosure.

A third embodiment of the present disclosure relates to a private key update method applied to a chip, for example, a fingerprint identification chip shown in FIG. 5. The private key update method in this embodiment includes: sending a private key update request to a server, the server storing an update random number, an update public key, and a first public key corresponding to a first private key of the chip, and the first private key being a private key to be updated according to the private key update request; receiving the update random number fed back by the server, and generating an update private key according to the update random number and a stored internal key; generating an update public key corresponding to the update private key according to the update private key, and signing an information to be signed by using the update private key, where the information to be signed at least includes the update public key; and sending the signed information to the server, so that the server verifies the received signed information by using the update public key stored in the server, and updates the first public key to be the update public key after the verification succeeds. Therefore, when the private key of the chip is updated, lots of manpower and material resources can be saved, and the security and reliability are improved. Implementation details of the private key update method in this embodiment are specifically described below, and the following are the implementation details provided for ease of understanding and are not mandatory for implementing this solution.

Figure 6:
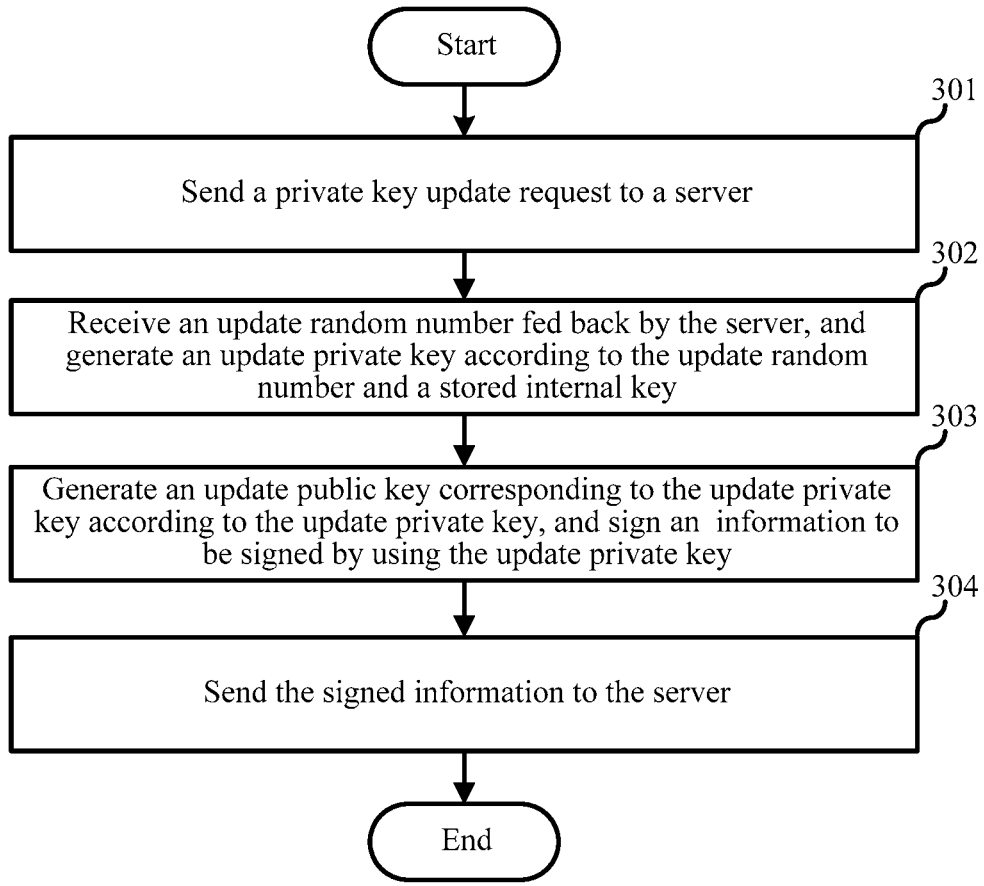
FIG. 6 is a flowchart of the private key update method according to the third embodiment of the present disclosure.

A specific process of the private key update method in this embodiment is shown in FIG. 6, including the following steps:

Step 301: Send a private key update request to a server.

Specifically, the chip may send the private key update request to the server through a host computer. The server stores an update random number, an update public key, and a first public key corresponding to a first private key of the chip. The first private key is a private key that the update request requests to update and is currently used by the chip, that is, the first private key may be an initial private key, or may be a private key that has been updated several times. When receiving the private key update request of the chip, the server may find the update random number stored in the server of the chip.

Preferably, because the server may store update random numbers, update public keys, and first public keys of several chips, different chips may have different identification numbers, to distinguish update random numbers, update public keys, and first public keys of different chips. An identification number of the chip may be carried when the chip sends the private key update request, so that the server may find the update random number corresponding to the identification number according to the identification number carried in the received private key update request.

Step 302: Receive an update random number fed back by the server, and generate an update private key according to the update random number and a stored internal key.

Specifically, the chip may receive the update random number fed back by the server through a host computer, that is, the server may first send the update random number to the host computer, and the host computer then sends the update random number to the chip. The chip may store the update random number and may be restarted to enter bootloader. Bootloader has the right to read the internal key, so that the update private key may be generated according to the read internal key and the update random number. The update private key may be generated specifically by using an ECC solution or an RSA solution. The ECC solution or the RSA solution has been described in detail in the first embodiment, and is not described herein again to avoid repetition.

Step 303: Generate an update public key corresponding to the update private key according to the update private key, and sign an information to be signed by using the update private key.

Specifically, the chip may generate the update public key corresponding to the update private key according to the update private key. The chip signs the information to be signed by using the update private key, that is, encrypts the information to be signed by using the update private key. The information to be signed in this embodiment may be an update public key pubkey_device2, the signature may be denoted as sig, and the signed information may be represented as: (pubkey_device2, sig).

Step 304: The signed information is sent to the server.

Specifically, the chip may first send the signed information to the host computer, and the host computer then sends the signed information to the server. The server may verify the received signed information (pubkey_device2, sig) by using the update public key pubkey_device2 stored in the server, that is, the server may decrypt sig by using the stored pubkey_device2. If data obtained after decryption is pubkey_device2, the verification may be considered as successful. After the verification succeeds, the first public key currently used by the chip is updated to be the update public key. Further, the server may make a certificate or signature based on the update public key, send the certificate or signature to the chip, and revoke a certificate of the original first public key of the chip. The chip may store the certificate or signature of the update public key sent by the server, and completes the update of the private key after restart. If the verification fails, the update is stopped.

Compared with the existing technology, in this embodiment of the present disclosure, the chip sends a private key update request to the server. The server stores an update random number, an update public key, and a first public key corresponding to the first private key of the chip. The first private key is a private key to be updated according to the private key update request. Therefore, the server may feed back the update random number stored in the server to the chip after receiving the private key update request. The chip generates the update private key according to the update random number and the stored internal key, that is, the update private key of the chip may be obtained only by the chip, which conforms to the principle that the private key of the chip is known only to the chip, thus improving the security and reliability. The chip generates the update public key corresponding to the update private key according to the update private key, and signs the information to be signed by using the update private key. The information to be signed at least includes the update public key, and is signed by using the update private key, so that the communication security can be ensured even if the initial private key is leaked. The chip sends the signed information to the server, so that the server can verify the received signed information by using the update public key stored in the server, and update the first public key to be the update public key after the verification succeeds. In the private key update method in this embodiment of the present disclosure, it is ensured that when a user of the chip changes, the chip is repaired, and an original private key is leaked, the private key of the chip is securely updated online. The method avoids the defect that the security of the chip is not ensured due to the conventional way of returning to the factory for update or directly revoking the public key, which is practical.

A fourth embodiment of the present disclosure relates to a private key update method. The fourth embodiment is a further improvement based on the third embodiment, and the main improvement is that: in the fourth embodiment, in the current update, a second public key and a third random number that will be used for the next update are generated, and after the information to be signed further including the second public key and the third random number is signed by using the update private key, the signed information is sent to the server, so that after the verification on the received signed information succeeds, the server can complete the update of the first public key and the first private key that are currently used, and can also store the second public key and the third random number that will be used for the next update, thus facilitating the next update.

Figure 7:
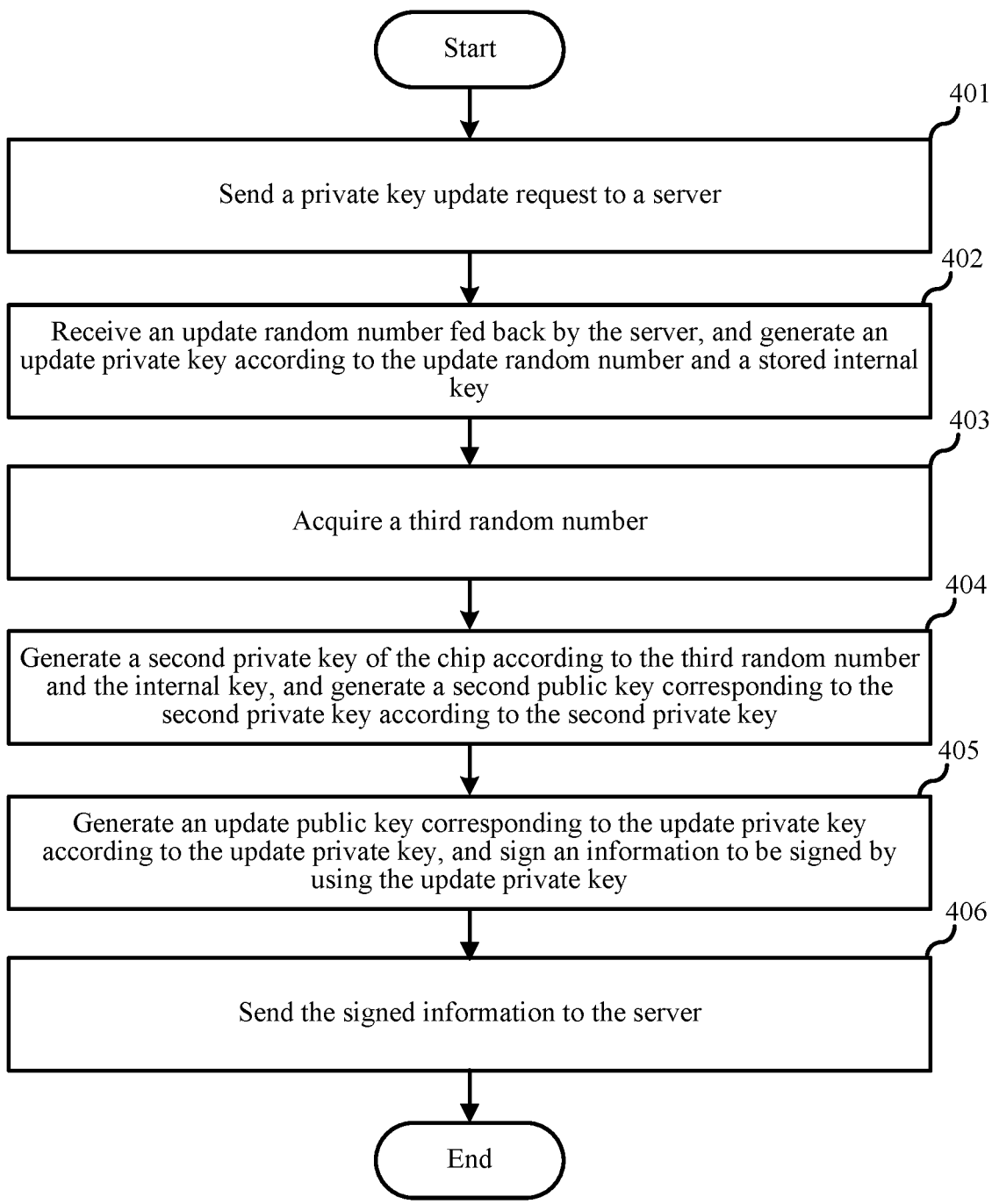
FIG. 7 is a flowchart of a private key update method according to a fourth embodiment of the present disclosure.

A specific process of the private key update method in this embodiment is shown in FIG. 7, including the following steps:

Step 401: Send a private key update request to a server.

Step 402: Receive an update random number fed back by the server, and generate an update private key according to the update random number and a stored internal key.

Specifically, step 402 is roughly the same as step 302 in the third embodiment, and a difference lies in that: in this embodiment, when the chip receives the update random number fed back by the server, it indicates that the private key update request of the chip has passed additional verification of the server. Before feeding back the update random number stored in the server to the chip, the server may verify the update request; and if the verification succeeds, the update random number stored in the server of the chip is then fed back to the chip. The server may use other auxiliary identity verification methods such as a token, a short message, an email, and a user name password; or analyze whether the chip has an abnormal behavior, for example, applying for private key update many times in a short period of time. If the verification fails, the server may further send an alarm, thus further improving the security of the update.

Step 403: Acquire a third random number.

Specifically, to make sure that the next update can be made, the chip may call a random number generation module to generate the third random number random3.

Step 404: Generate a second private key of the chip according to the third random number and the internal key, and generate a second public key corresponding to the second private key according to the second private key.

Specifically, the second private key may be generated by using an ECC solution or an RSA solution. The ECC solution or the RSA solution has been described in detail in the first embodiment, and is not described herein again to avoid repetition. After obtaining the second private key, the chip may obtain the second public key corresponding to the second private key by calculating according to the second private key, where the second private key and the second public key are respectively a private key and a public key that are obtained after the next update.

In the actual application, after the second public key corresponding to the second private key is generated, the second private key may be destroyed, to prevent an attacker from obtaining the second private key by cracking the chip.

Step 405: Generate an update public key corresponding to the update private key according to the update private key, and sign an information to be signed by using the update private key.

Specifically, the chip may generate the update public key corresponding to the update private key according to the update private key, and sign the information to be signed by using the update private key. The information to be signed in this embodiment includes: the update public key pubkey_device2, the third random number random3, and the second public key pubkey_device3. The chip uses the update private key to sign a message spliced by pubkey_device2, random3, and pubkey_device3, and the signed information may be represented as: (pubkey_device2, random3, pubkey_device3, sig).

In the actual application, to further ensure that the signed information is not leaked when being transmitted to the server, the information to be signed may further include a challenge code challenge. When the server receives the private key update request, if the update random number random2 corresponding to an identification number of the chip is found, the server may generate the challenge code challenge, and send the challenge code to the chip, where the challenge code is a random number that does not repeat each time. The chip may receive, through a host computer, the challenge code fed back by the server. The chip uses the update private key to sign a message spliced by pubkey_device2, random3, pubkey_device3, and challenge, and the information with the signature may be represented as: (pubkey_device2, random3, pubkey_device3, challenge, sig).

Step 406: Send the signed information to the server.

Specifically, the chip may first send the signed information to the host computer, and the host computer then sends the signed information to the server. The server may verify the received signed information (pubkey_device2, random3, pubkey_device3, sig) by using the stored pubkey_device2, that is, the server may decrypt sig by using the stored pubkey_device2. If data obtained after decryption is pubkey_device2, random3, pubkey_device3, the verification may be considered as successful. After the verification succeeds, the first public key currently used by the chip is updated to be the update public key, the update random number random2 stored in the server is replaced with the third random number random3, and the update public key pubkey_device2 stored in the server is replaced with the second public key pubkey_device3. That is, if the verification succeeds, the following operations are performed: (a) updating a public key of the chip, pubkey_device=pubkey_device2; (b) updating a public key corresponding to a private key obtained after the next update, pubkey_device2=pubkey_device3; (c) updating a random number to be issued in the next update of the private key, random2=random3; (d) revoking an original certificate/public key of the chip; and (e) making a certificate or a signature based on the new public key pubkey_device2 and sending the certificate or signature to the chip. The chip stores the new certificate or signature sent by the server, and completes the update of the private key after restart.

Figure 8:
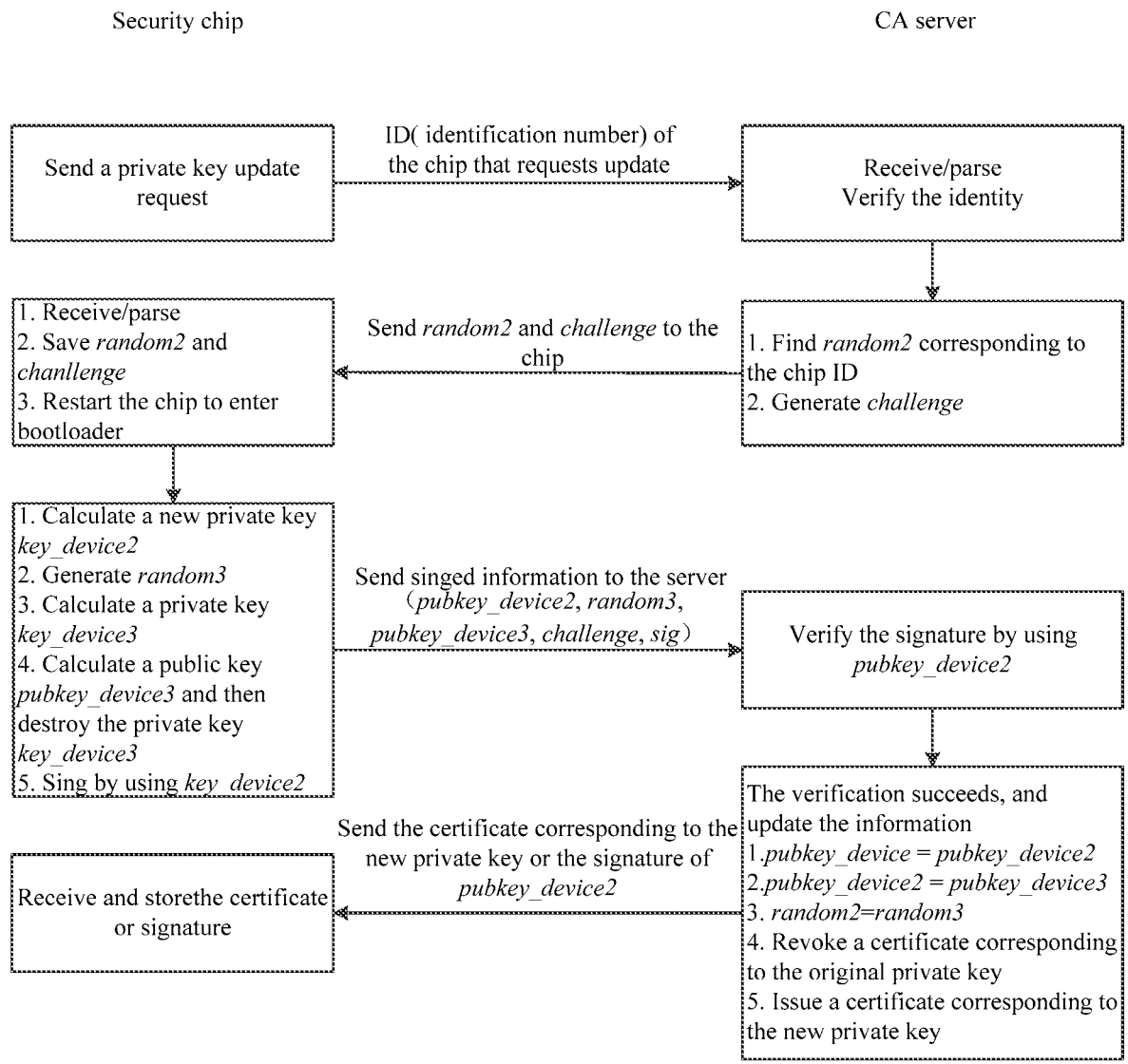
FIG. 8 is a schematic diagram of interaction between a chip and a server in the private key update method according to the fourth embodiment of the present disclosure.

For further ease of understanding, this embodiment provides a schematic diagram of interaction between a CA server and a security chip as shown in FIG. 8. The CA server and the security chip cooperate with each other to implement the update of the private key. Because the interaction between the server and the chip is covered in the content of step 401 to step 406, details are not described herein again to avoid repetition.

Compared with the existing technology, this embodiment has the following effects: (1) The private key never comes out of the chip: only the chip can restore the private key and a private key to be updated, and even the CA server cannot calculate the private key of the chip (including a previous private key and the private key to be updated). (2) Communication security is ensured: a new private key is used to make a signature, so that the communication security can be ensured even if an original private key is leaked. (3) Chip security is ensured: the random number required for generating a new private key is not stored in the chip, to prevent an attacker from obtaining the updated private key by cracking the chip. (4) The update is controllable: the private key update is controlled by the CA server, so that the server may use other auxiliary identity verification methods such as a token, an email, and a mobile verification code to further confirm the security of the update.

A fifth embodiment of the present disclosure relates to a key acquisition method applied to a server, including: receiving and storing an update random number, an update public key, and a first public key corresponding to a first private key that are sent by a chip, where the first private key is a private key currently used by the chip; feeding back the update random number stored in the server to the chip when receiving a private key update request of the chip, so that the chip generates an update private key and a corresponding update public key according to the update random number and an internal key of the chip, and signs an information to be signed by using the update private key, where the information to be signed at least includes the update public key; receiving the signed information sent by the chip; and verifying the received signed information by using the update public key stored in the server, and updating the first public key to be the update public key after the verification succeeds. Therefore, lots of manpower and material resources can be saved during updating the private key of the chip, and the security and reliability are improved. Implementation details of the key acquisition method in this embodiment are specifically described below, and the following are the implementation details provided for ease of understanding and are not mandatory for implementing this solution.

Figure 9:
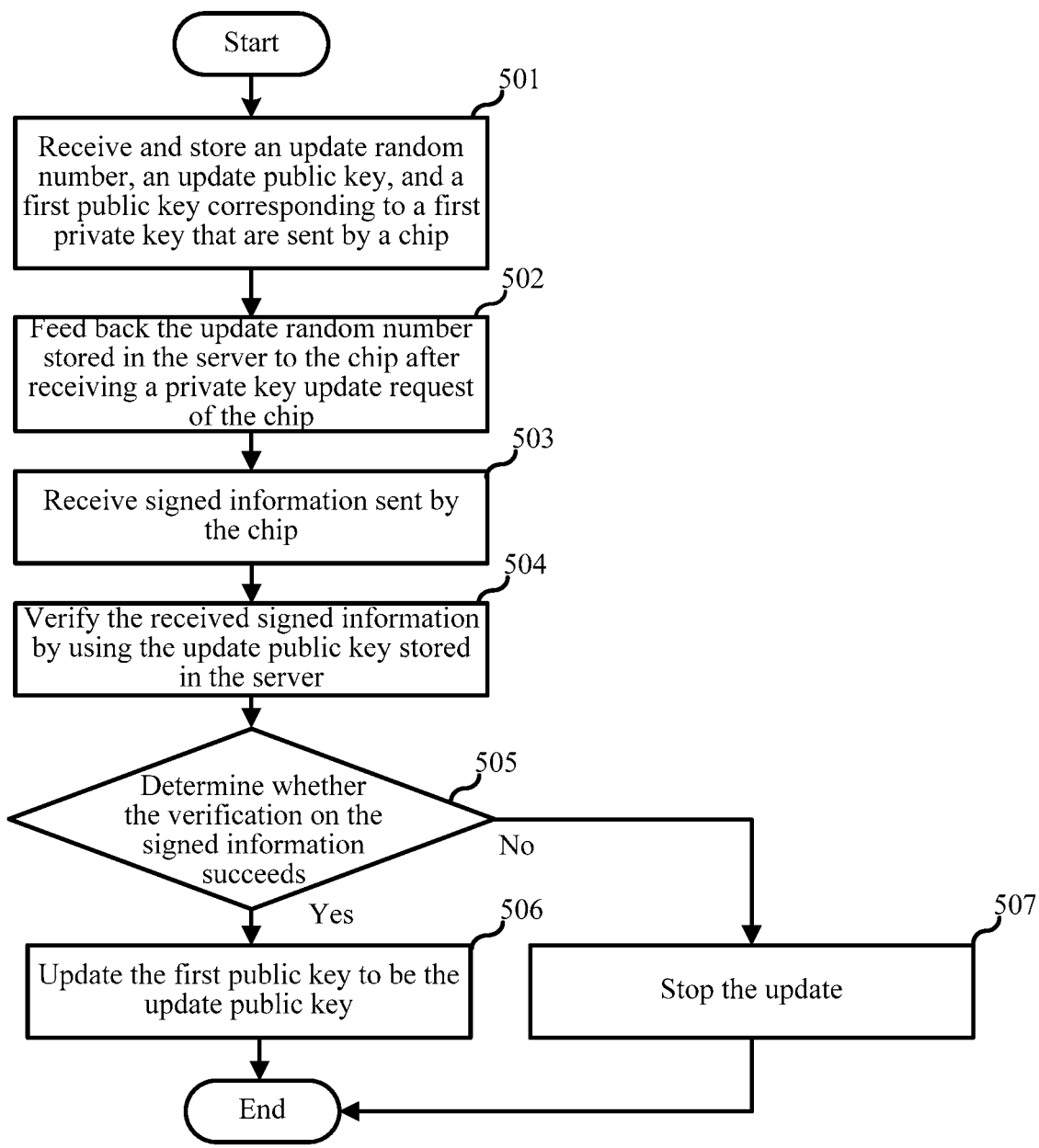
FIG. 9 is a flowchart of a key acquisition method according to a fifth embodiment of the present disclosure.

A specific process of the key acquisition method in this embodiment is shown in FIG. 9, including the following steps:

Step 501: Receive and store an update random number, an update public key, and a first public key corresponding to a first private key that are sent by a chip.

Step 502: Feed back the update random number stored in the server to the chip after receiving a private key update request of the chip.

Step 503: Receive a signed information sent by the chip.

Step 504: Verify the received signed information by using the update public key stored in the server.

Step 505: Determine whether the verification on the signed information succeeds: if the verification succeeds, perform step 506, and if not, perform step 507.

Step 506: Update the first public key to be the update public key.

Step 507: Stop the update.

It is not difficult to find that, the key acquisition method in this embodiment is applied to a server, the private key update method in the third embodiment is applied to a chip, and the chip and the server may cooperate with each other to complete the update of the private key of the chip. Therefore, the private key update method in the third embodiment may be implemented in cooperation with this embodiment. The related technical details mentioned in the third embodiment are still effective in this embodiment, and are not described herein again to reduce repetition. Correspondingly, the related technical details mentioned in this embodiment may also be applied in the third embodiment.

A sixth embodiment of the present disclosure relates to a key acquisition method. The sixth embodiment is a further improvement based on the fifth embodiment, and the main improvement is that: in the sixth embodiment, after the private key update request of the chip is received, and before the update random number stored in the server is fed back to the chip, the update request is verified; and if the verification succeeds, the update random number stored in the server of the chip is then fed back to the chip, thus further improving the security of the update.

Figure 10:
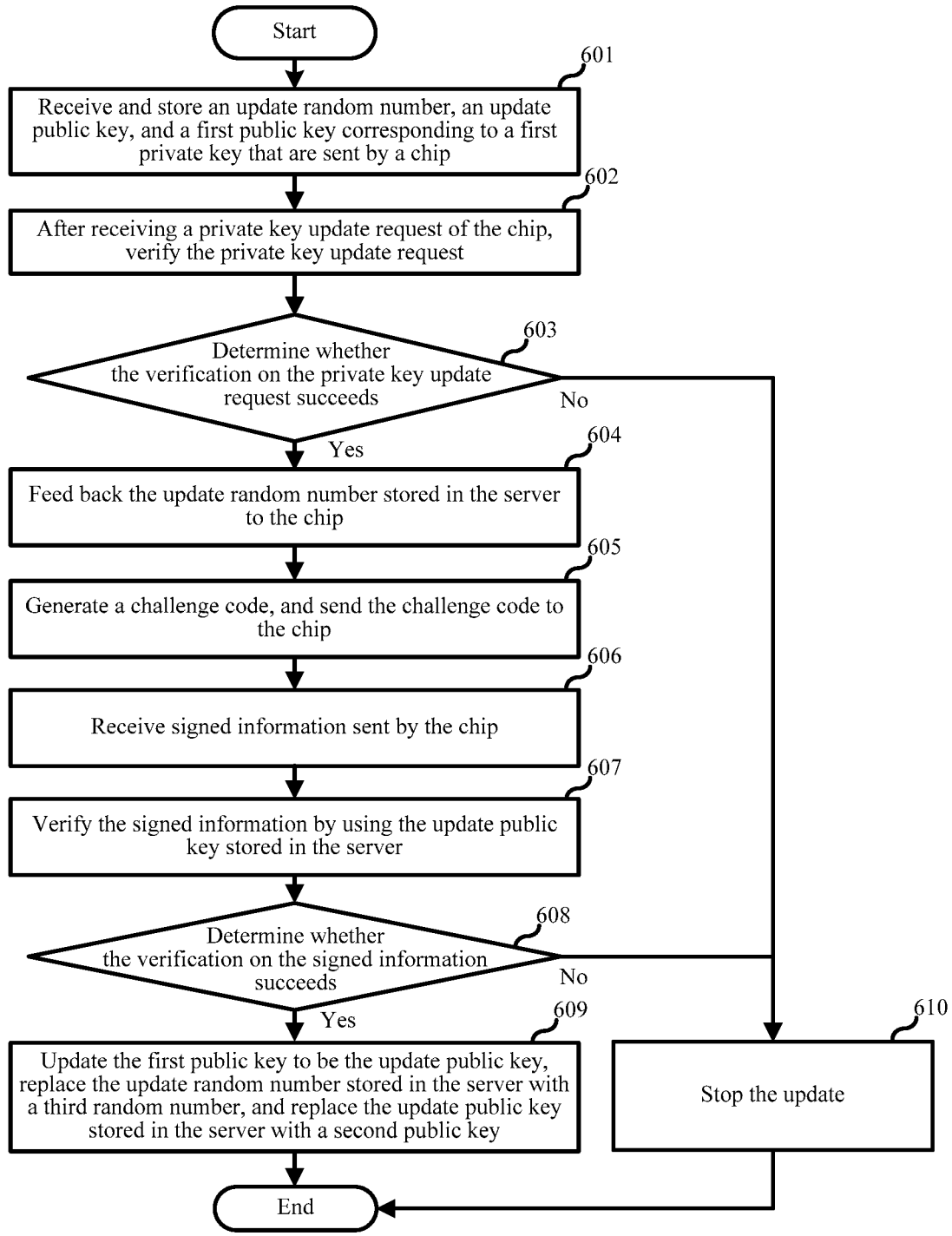
FIG. 10 is a flowchart of a key acquisition method according to a sixth embodiment of the present disclosure.

A specific process of the key acquisition method in this embodiment is shown in FIG. 10, specifically including the following steps:

Step 601: Receive and store an update random number, an update public key, and a first public key corresponding to a first private key that are sent by a chip.

Step 602: Verify the private key update request when receiving a private key update request of the chip.

Step 603: Determine whether the verification on the private key update request succeeds: if yes, perform step 604, and if not, perform step 609.

Step 604: Feed back the update random number stored in the server to the chip.

Step 605: Generate a challenge code, and send the challenge code to the chip.

It should be noted that, there is no obvious sequence relationship between step 604 and step 605. In the actual application, the server may simultaneously send the update random number random2 and the challenge code challenge to the chip, or first send the challenge code and then send the update random number. In this embodiment, that the update random number is sent first is only used as an example, and the actual application is not limited thereto.

Step 606: Receive a signed information sent by the chip.

Step 607: Verify the received signed information by using the update public key stored in the server.

Step 608: Determine whether the verification of the signed information succeeds: if the verification succeeds, perform step 609, and if not, perform step 610.

Step 609: Update the first public key to be the update public key, replace the update random number stored in the server with a third random number, and replace the update public key stored in the server with a second public key.

Step 610: Stop the update.

It is not difficult to find that, the key acquisition method in this embodiment is applied to a server, the private key update method in the fourth embodiment is applied to a chip, and the chip and the server may cooperate with each other to complete the update of the private key of the chip. Therefore, the private key update method in the fourth embodiment may be implemented in cooperation with this embodiment. The related technical details mentioned in the fourth embodiment are still effective in this embodiment, and are not described herein again to reduce repetition.

Correspondingly, the related technical details mentioned in this embodiment may also be applied in the fourth embodiment.

Figure 11:
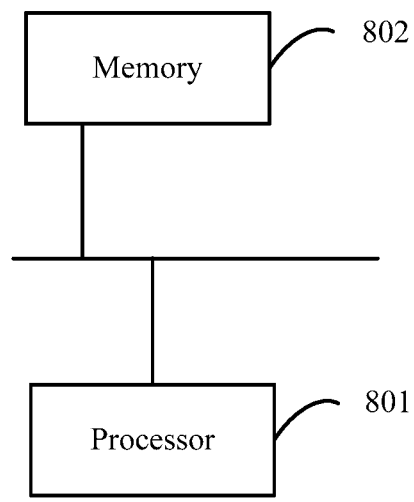
FIG. 11 is a schematic structural diagram of a chip according to a seventh embodiment of the present disclosure.

A seventh embodiment of the present disclosure relates to a chip. As shown in FIG. 11, the chip includes: at least one processor 801, and a memory 802 communicably connected with the at least one processor 801. The memory 802 stores an instruction executable by the at least one processor 801, and the instruction, when executed by the at least one processor 801, causes the at least one processor 801 to perform the key generation method or the private key update method as described above.

The memory 802 and the processor 801 are connected by a bus, the bus may include any quantity of interconnected buses and bridges, and the bus connects one or more processors 801 to various circuits of the memory 802. The bus may further connect various other circuits such as a peripheral device, a voltage regulator, and a power management circuit together. These are all known in the field, and therefore are not further described in this specification. A bus interface provides an interface between the bus and a transceiver. The transceiver may be one component or a plurality of components, for example, a plurality of receivers and transmitters, and provides an unit for communicating with various other apparatuses on a transmission medium. Data processed by the processor 801 is transmitted on a wireless medium by using an antenna. Further, the antenna further receives data and transfers the data to the processor 801.

The processor 801 is responsible for managing the bus and usual processing, and further provides various functions including timing, peripheral interfacing, voltage adjustment, power management, and other control functions. The memory 802 may be configured to store data used by the processor 801 during operations.

Figure 12:
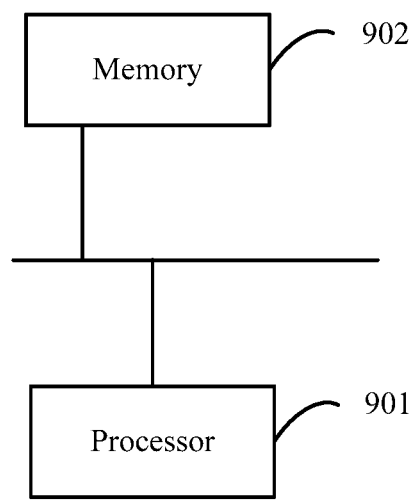
FIG. 12 is a schematic structural diagram of a server according to an eighth embodiment of the present disclosure.

An eighth embodiment of the present disclosure relates to a server. As shown in FIG. 12, the server includes: at least one processor 901, and a memory 902 communicably connected with the at least one processor 901. The memory 902 stores an instruction executable by the at least one processor 901, and the instruction, when executed by the at least one processor 901, causes the at least one processor 901 to perform the key acquisition method as described above.

The memory 902 and the processor 901 are connected by a bus, the bus may include any quantity of interconnected buses and bridges, and the bus connects one or more processors 901 to various circuits of the memory 902. The bus may further connect various other circuits such as a peripheral device, a voltage regulator, and a power management circuit together. These are all known in the field, and therefore are not further described in this specification. A bus interface provides an interface between the bus and a transceiver. The transceiver may be one component or a plurality of components, for example, a plurality of receivers and transmitters, and provides an unit for communicating with various other apparatuses on a transmission medium. Data processed by the processor 901 is transmitted on a wireless medium by using an antenna. Further, the antenna further receives data and transfers the data to the processor 901.

The processor 901 is responsible for managing the bus and usual processing, and further provides various functions including timing, peripheral interfacing, voltage adjustment, power management, and other control functions. The memory 902 may be configured to store data used by the processor 901 during operations.

In addition, those skilled in the art may understand that all or some of the steps for implementing the methods in the foregoing embodiments may be completed by a program instructing relevant hardware. The program is stored in a storage medium, including several instructions for enabling one device (which may be a single-chip microcomputer, a chip, or the like) or a processor to perform all or some of the steps of the methods described in the embodiments of the present disclosure. The foregoing storage medium includes: any medium that can store program code, such as a USB flash memory drive, a removable hard disk, a read-only memory (ROM), a random access memory (RAM), a magnetic disk, or an optical disc.

Those of ordinary skill in the art can understand that the above embodiments are specific embodiments for implementing the present disclosure, and in the actual application, various changes may be made on the form and details without departing from the spirit and scope of the present disclosure.

What is claimed is:

1. A key generation method, applied to a chip, wherein the chip stores an internal key, the method comprises:
acquiring a first random number and a second random number;
generating an initial private key of the chip according to the first random number and the internal key, and generating an update private key of the chip according to the second random number and the internal key;
generating an initial public key corresponding to the initial private key according to the initial private key, and generating an update public key corresponding to the update private key according to the update private key; and
sending the initial public key, the update public key, and the second random number to a server that is configured to send the second random number to the chip when receiving a private key update request of the chip, to trigger a private key update of the chip.

2. The key generation method according to claim 1, wherein after sending the initial public key, the update public key, and the second random number to the server, the method further comprises:
destroying the second random number, the update private key, and the update public key.

3. The key generation method according to claim 1, wherein generating the initial private key of the chip according to the first random number and the internal key, and generating the update private key of the chip according to the second random number and the internal key comprises:
acquiring the internal key by firmware;
generating, by the firmware, the initial private key of the chip according to the internal key and the first random number, and generating the update private key of the chip according to the internal key and the second random number; and
the key generation method of the chip further comprises:
disabling an access authority of the firmware to the internal key after sending the initial public key, the update public key, and the second random number to the server.

4. The key generation method according to claim 1, wherein the first random number and the second random number are random numbers generated by a random number module embedded in the chip.

5. The key generation method according to any of claims 1 to 4, wherein both the initial private key and the update private key are ECC private keys; or
both the initial private key and the update private key are RSA private keys; or one of the initial private key and the update private key is an ECC private key, and the other is an RSA private key.

6. The key generation method according to any of claims 1 to 4, wherein the internal key is stored in a read-only storage area of the chip.

7. A private key update method, applied to a chip, comprising:
sending a private key update request to a server, the server storing an update random number, an update public key, and a first public key corresponding to a first private key of the chip, wherein the first private key is a private key to be updated according to the private key update request;
receiving the update random number fed back by the server, and generating an update private key according to the update random number and a stored internal key;
generating an update public key corresponding to the update private key according to the update private key, and signing an information to be signed by using the update private key, wherein the information to be signed at least comprises the update public key; and
sending signed information to the server, so that the server verifies received signed information by using the update public key stored in the server, and updates the first public key to be the update public key after the verification succeeds.

8. The private key update method according to claim 7, wherein before signing the information to be signed by using the update private key, the method further comprises:
acquiring a third random number;
generating a second private key of the chip according to the third random number and the internal key, and generating a second public key corresponding to the second private key according to the second private key; and
the information to be signed further comprises: the third random number and the second public key; and
the third random number and the second public key are provided for the server to replace the update random number stored in the server with the third random number and replaces the update public key stored in the server with the second public key after the verification succeeds.

9. The private key update method according to claim 8, wherein after generating the second public key corresponding to the second private key according to the second private key, the method further comprises:
destroying the second private key.

10. The private key update method according to claim 8, wherein before signing the information to be signed by using the update private key, the method further comprises:
receiving a challenge code fed back by the server, wherein the challenge code is a challenge code generated by the server after receiving the private key update request; and
the information to be signed further comprises the challenge code.

11. The private key update method according to any of claims 7 to 10, wherein the private key update request carries an identification number of the chip, the identification number is configured for searching the update random number by the server.

12. A key acquisition method, applied to a server, comprising:
receiving and storing an update random number, an update public key, and a first public key corresponding to a first private key that are sent by a chip, wherein the first private key is a private key currently used by the chip;
feeding back the update random number stored in the server to the chip after receiving a private key update request of the chip, so that the chip generates an update private key and a corresponding update public key according to the update random number and an internal key of the chip, and signs an information to be signed by using the update private key, wherein the information to be signed at least comprises the update public key;
receiving signed information sent by the chip; and
verifying received signed information by using the update public key stored in the server, and updating the first public key to be the update public key after the verification succeeds.

13. The chip according to claim 12, wherein after sending the initial public key, the update public key, and the second random number to the server, the method further comprises:
destroying the second random number, the update private key, and the update public key.

14. The chip according to claim 12, wherein generating the initial private key of the chip according to the first random number and the internal key, and generating the update private key of the chip according to the second random number and the internal key comprises:
acquiring the internal key by firmware;
generating, by the firmware, the initial private key of the chip according to the internal key and the first random number, and generating the update private key of the chip according to the internal key and the second random number; and
the key generation method of the chip further comprises:
disabling an access authority of the firmware to the internal key after sending the initial public key, the update public key, and the second random number to the server.

15. The chip according to claim 12, wherein the first random number and the second random number are random numbers generated by a random number module embedded in the chip.

16. The chip according to claim 12, wherein both the initial private key and the update private key are elliptic curves cipher (ECC) private keys; or
both the initial private key and the update private key are RSA private keys; or
one of the initial private key and the update private key is an ECC private key, and the other is an RSA private key.

17. The chip according to claim 12, wherein the internal key is stored in a read-only storage area of the chip.

* * * * *